(12) United States Patent
Koizumi et al.

(10) Patent No.: US 9,305,584 B2
(45) Date of Patent: Apr. 5, 2016

(54) DETERMINING OSCILLATION CHARACTERISTIC FOR HIGH-FREQUENCY ASSISTED MAGNETIC RECORDING DEVICE

(71) Applicant: Kabushiki Kaisha Toshiba, Minato-ku, Tokyo (JP)

(72) Inventors: Gaku Koizumi, Yokohama Kanagawa (JP); Tomoko Taguchi, Kunitachi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/626,460

(22) Filed: Feb. 19, 2015

(65) Prior Publication Data

US 2016/0064016 A1    Mar. 3, 2016

(30) Foreign Application Priority Data

Aug. 27, 2014    (JP) .................................. 2014-172407

(51) Int. Cl.
| | | |
|---|---|---|
| *G11B 11/00* | (2006.01) | |
| *G11B 7/00* | (2006.01) | |
| *G11B 5/00* | (2006.01) | |

(52) U.S. Cl.
CPC .......... *G11B 7/00* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 8,027,110 B1 | 9/2011 | Yamanaka et al. | |
| 8,885,274 B1 * | 11/2014 | Furukawa | G11B 20/10305 360/31 |
| 8,917,465 B1 * | 12/2014 | Contreras | G11B 5/455 360/31 |
| 9,001,444 B1 * | 4/2015 | Contreras | G11B 5/127 360/31 |
| 9,007,723 B1 * | 4/2015 | Igarashi | G11B 5/314 360/125.3 |
| 9,070,397 B1 * | 6/2015 | Ito | G11B 5/6005 |
| 9,099,107 B1 * | 8/2015 | Igarashi | G11B 5/31 |
| 9,099,128 B1 * | 8/2015 | Contreras | G11B 5/455 |
| 2012/0307404 A1 | 12/2012 | Braganca et al. | |
| 2013/0050865 A1 | 2/2013 | Katada et al. | |
| 2013/0148234 A1 * | 6/2013 | Morinaga | G11B 5/02 360/75 |
| 2013/0170060 A1 * | 7/2013 | Johns | G11B 5/1278 360/31 |
| 2013/0335847 A1 * | 12/2013 | Shiroishi | G11B 5/02 360/46 |
| 2014/0168808 A1 | 6/2014 | Koizumi et al. | |

FOREIGN PATENT DOCUMENTS

| | | |
|---|---|---|
| JP | 2013-048002 A | 3/2013 |
| JP | 2014-120190 A | 6/2014 |

\* cited by examiner

*Primary Examiner* — Tan X Dinh
(74) *Attorney, Agent, or Firm* — White & Case LLP

(57) ABSTRACT

A magnetic disk device according to an embodiment includes a magnetic head including a write head with a high-frequency oscillator and a read head, a recording medium, a driving unit configured to moves the magnetic head on the recording medium, a measuring unit configured to obtain a first read signal with no current or a smaller current and a second read signal with a normal current supplied in the normal writing operation, a comparison unit configured to calculate comparative data indicating a comparison result between the first and second read signals, and a determination unit configured to determine an oscillation characteristic from the comparative data.

18 Claims, 12 Drawing Sheets

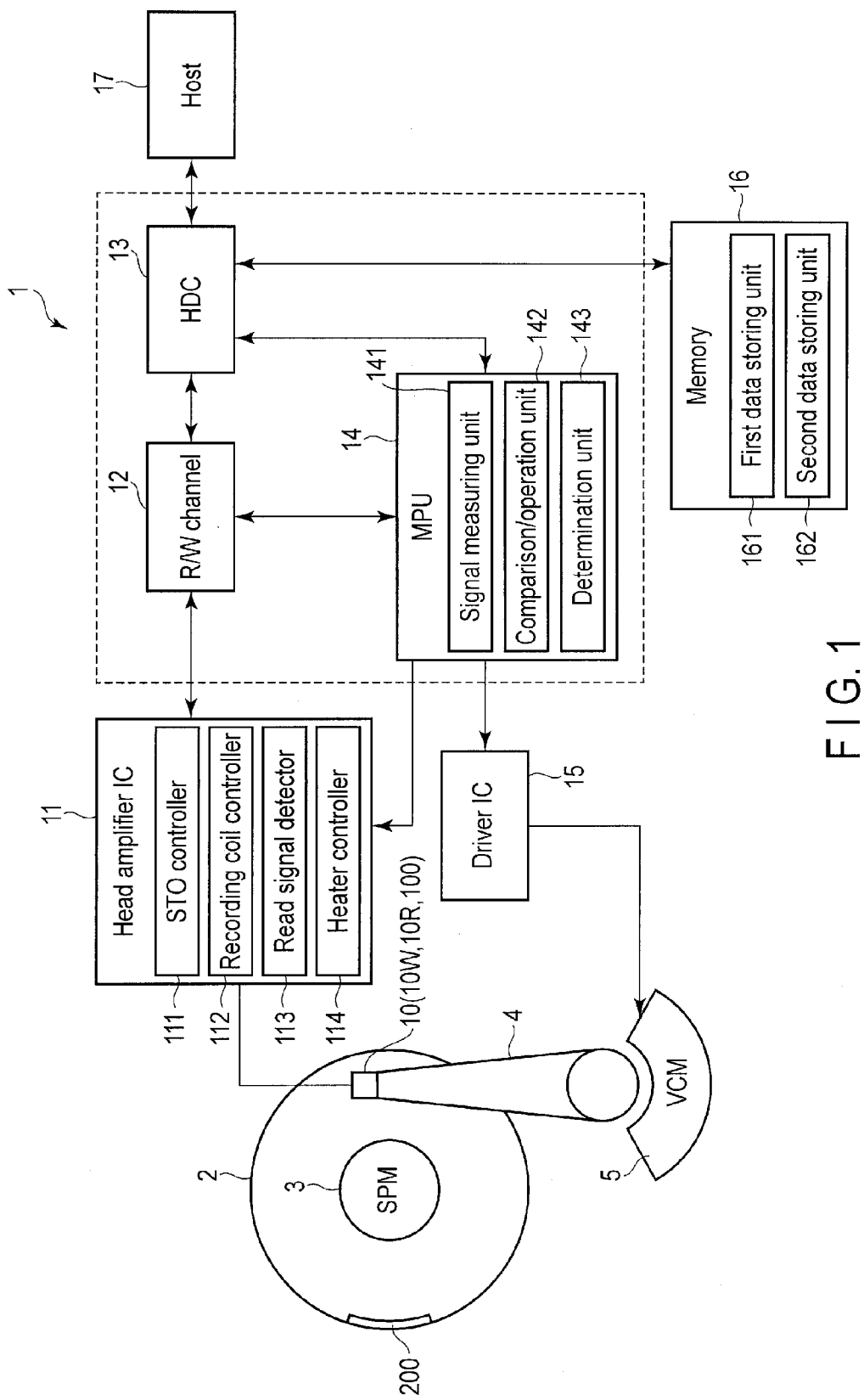
F I G. 1

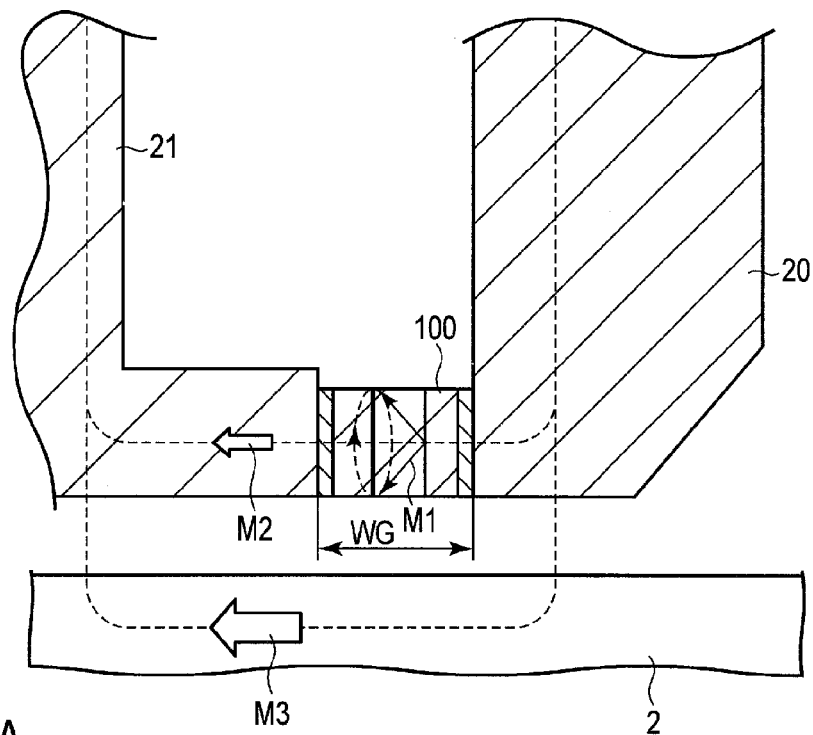
F I G. 4A
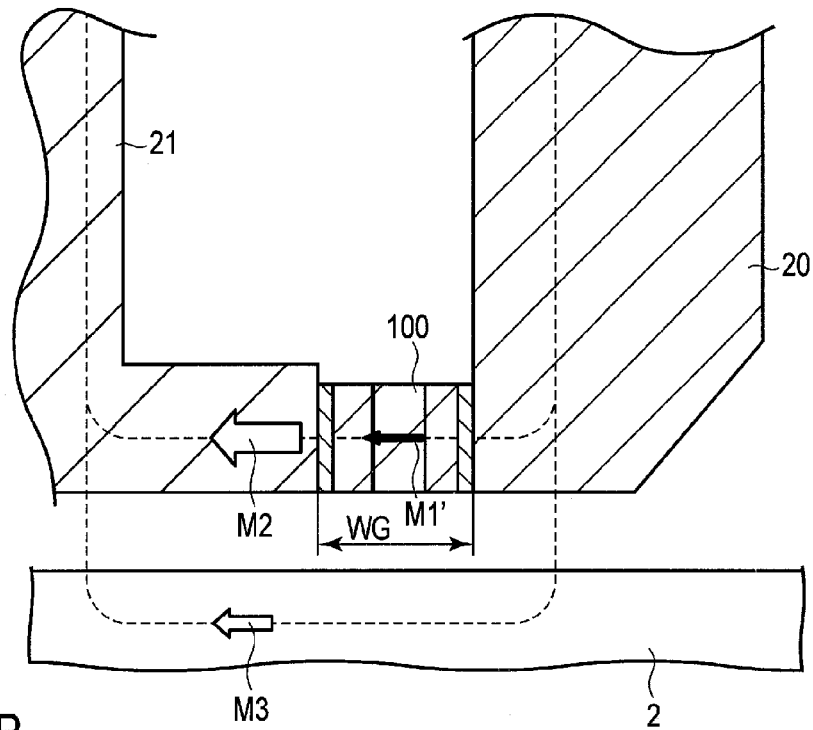
F I G. 4B

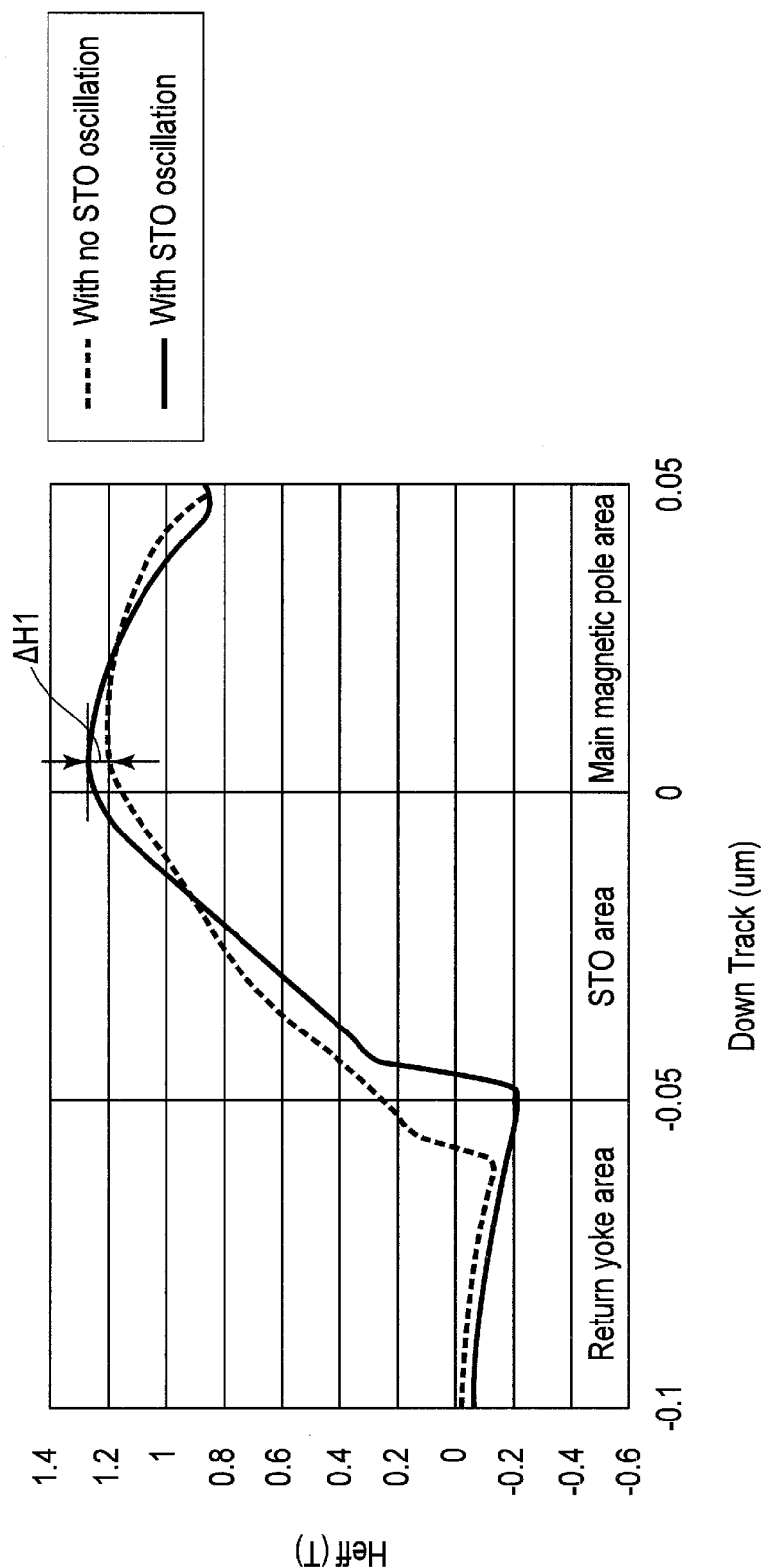
F I G. 5

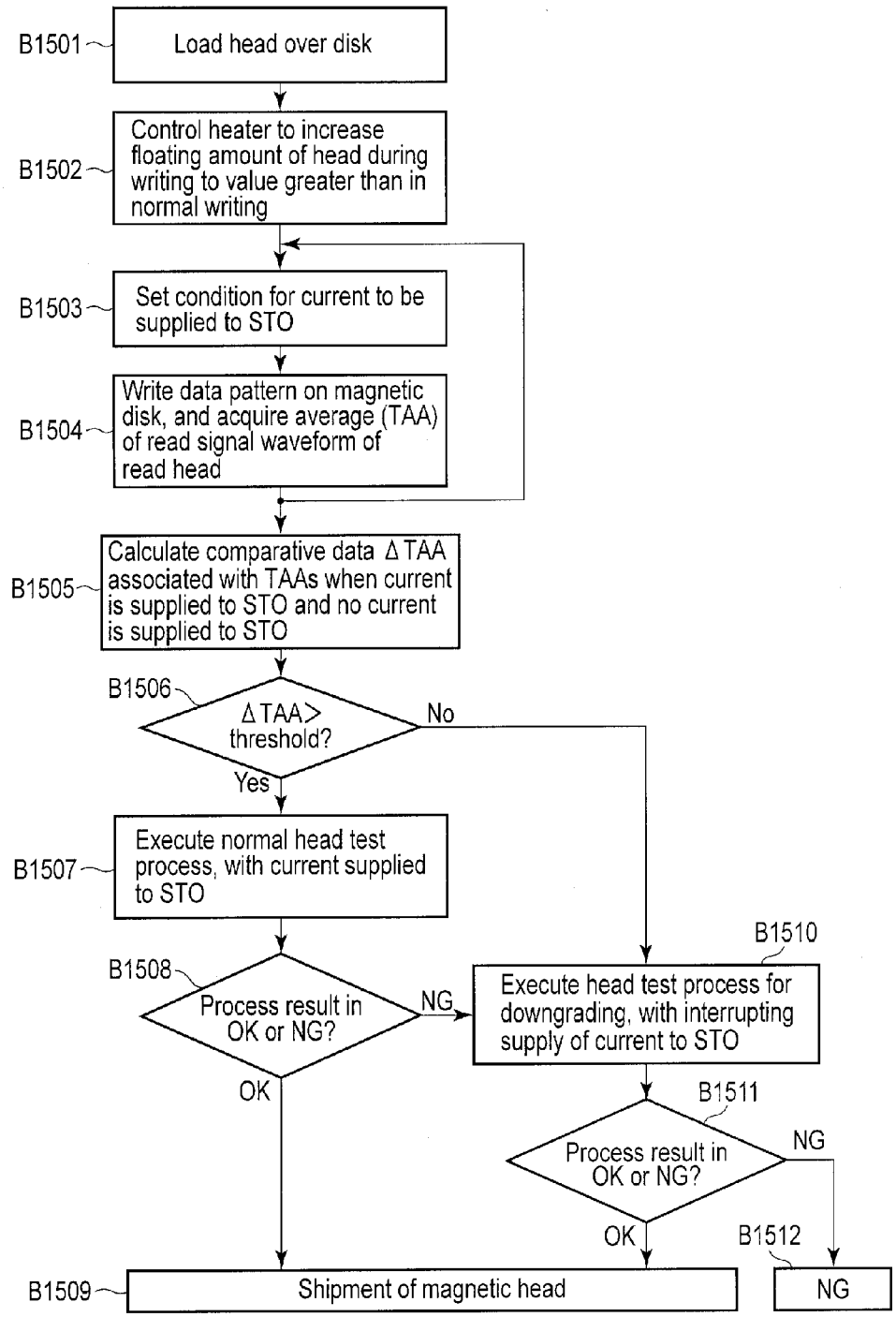
F I G. 12

DETERMINING OSCILLATION CHARACTERISTIC FOR HIGH-FREQUENCY ASSISTED MAGNETIC RECORDING DEVICE

CROSS-REFERENCE TO RELATED APPLICATIONS

This application is based upon and claims the benefit of priority from Japanese Patent Application No. 2014-172407, filed Aug. 27, 2014, the entire contents of which are incorporated herein by reference.

FIELD

Embodiments described herein relate generally to a magnetic disk device and a magnetic head evaluation method.

BACKGROUND

Recently, in the field of magnetic disk devices represented by a hard disk drive, a high-frequency assist recording scheme has been proposed as one recording scheme that can realize a higher recording density and a higher recording capacity.

In the high-frequency assist recording scheme, a magnetic head having a high-frequency oscillator element is used, and a high-frequency magnetic field is applied to a magnetic disk. For instance, a spin torque oscillator (STO) may be the high-frequency oscillator element. By supplying a current to the STO to oscillate it, the magnetic disk device generates a high-frequency magnetic field.

In a magnetic disk device with the high-frequency assist recording scheme, methods of evaluating the oscillation characteristic of the high-frequency oscillator element have been proposed. For instance, they include a method of evaluating the oscillation characteristic of the high-frequency oscillator element by confirming resistance changes in the element. The degree of the resistance change due to the oscillation of the high-frequency oscillator element varies depending upon amount of the magnetoresistive effect of the element itself. Accordingly, it is difficult to accurately determine the oscillation characteristic of the high-frequency oscillator element. Further, since the resistance change rate is low, it is difficult to achieve a high measurement accuracy.

BRIEF DESCRIPTION OF THE DRAWINGS

FIG. 1 is a block diagram showing a magnetic disk device according to a first embodiment;
FIG. 4A is an enlarged schematic view showing state of a tip of a write head when a spin torque oscillator (STO) is oscillating;
FIG. 4B is an enlarged schematic view showing state of the tip of the write head when the spin torque oscillator (STO) does not oscillate;
FIG. 5 is a graph showing an example of a calculation result associated with the intensity of a magnetic field generated by the head;

FIG. 12 is a flowchart showing a method, according to a fourth embodiment, executed in a shipping test process for determining whether there is an STO oscillation.

DETAILED DESCRIPTION

Figure 2:
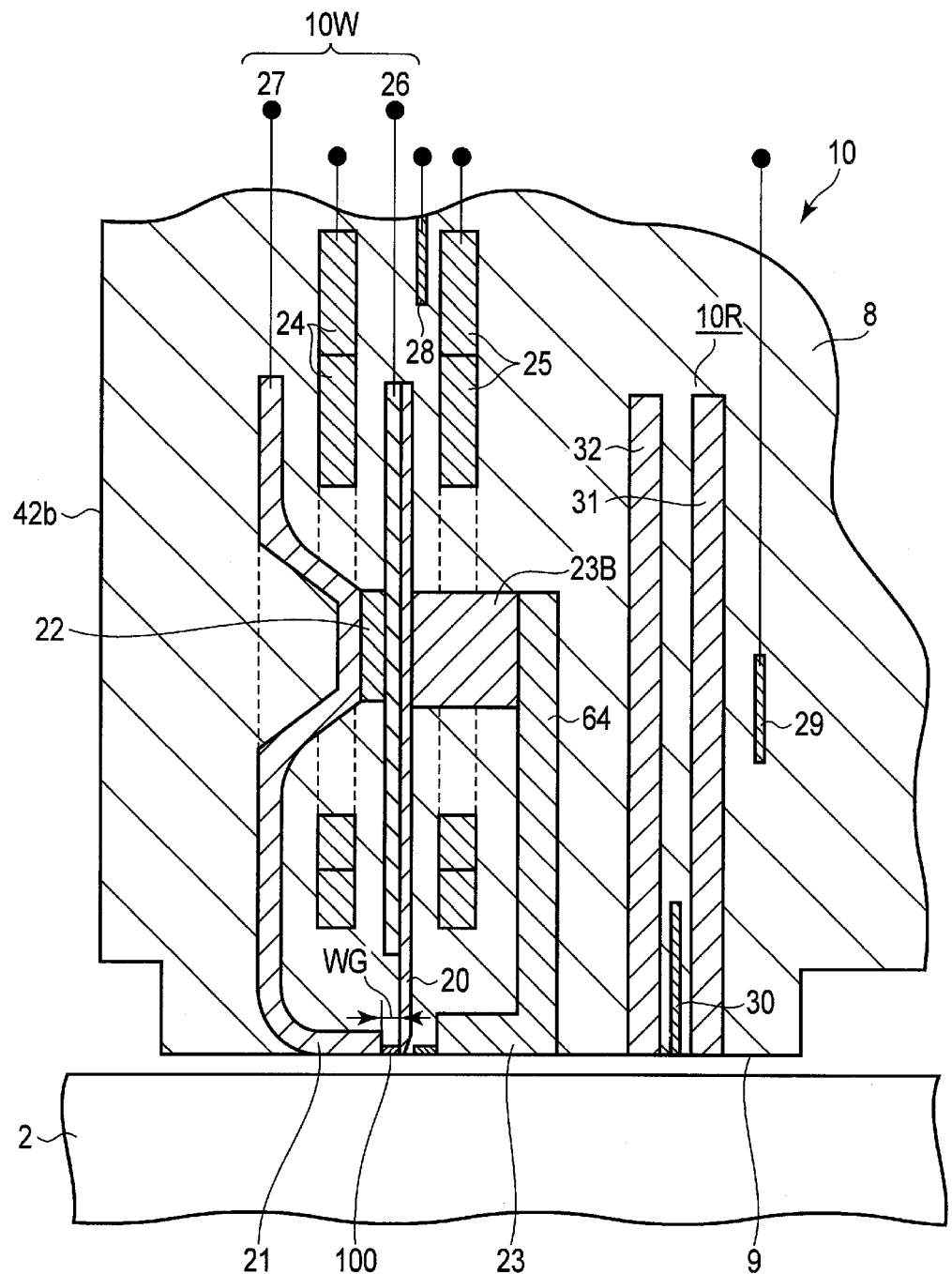
FIG. 2 is a cross-sectional view showing a head structure.

In accordance with one embodiment, there is provided a magnetic disk device comprising: a magnetic head including a write head with a high-frequency oscillator and a read head; a recording medium to and from which data is written and read by the magnetic head; a driving unit configured to move the magnetic head on the recording medium; a measuring unit configured to obtain a first read signal and a second read signal, the first read signal being obtained by reading a first data pattern written with no current or a smaller current than in the normal writing operation is supplied to the high-frequency oscillator, the second read signal being obtained by reading a second data pattern written with a normal current supplied in the normal writing operation is supplied to the high-frequency oscillator; a comparison unit configured to calculate comparative data indicative of a comparison result between the first and second read signals; and a determination unit configured to determine an oscillation characteristic of the high-frequency oscillator from the comparative data.

Embodiments will be described with reference to the accompanying drawings.

First Embodiment

FIG. 1 is a block diagram showing a magnetic disk device according to a first embodiment.

As shown in FIG. 1, a magnetic disk device 1 is realized as, for example, a hard disk drive (HDD), and comprises a magnetic disk (hereinafter, referred to as a disk) 2, a spindle motor (SPM) 3, an actuator (driving unit) 4, a voice coil motor (VCM) 5, a magnetic head (hereinafter, referred to as a head) 10, a head amplifier IC 11, an R/W channel 12, a hard disk controller (HDC) 13, a microprocessor (MPU) 14, a driver IC 15 and a memory 16. The magnetic disk device 1 can be connected to a host computer (host) 17. The head 10, which will be described later in detail, comprises a write head (record head, writer) 10W, a read head (reproducing head, reader) 10R, and a spin torque oscillator (STO) 100 as a high-frequency oscillator element. The R/W channel 12, the HDC 13 and the MPU 14 may be incorporated in a one-chip integrated circuit.

The disk 2 has a disk-shaped substrate formed of a non-magnetic material. On each surface of the substrate, a soft magnetic layer as an underlying layer formed of a material exhibiting soft magnetic characteristics, a magnetic recording layer exhibiting magnetic anisotropy perpendicularly to the disk surface, and a protective film, are stacked in the order mentioned from the bottom. The "bottom" means a position away from the head 10.

The disk 2 is fixed to the spindle motor (SPM) 3, and is rotated at a predetermined rotational speed by the SPM 3. A plurality of disks 2 may be fixed to the SPM 3. The SPM 3 is driven by a driving current (or driving voltage) supplied from the driver IC 15. A data pattern is written (recorded) on and read from the disk 2 by the head 10. The disk 2 has a monitor area (evaluation area) 200. The monitor area 200 is an area dedicated to evaluation of the oscillation characteristic of the STO 100. The monitor area 200 is provided on a part of the radially outermost or innermost circumference.

The actuator 4 is provided rotatable and has its tip supported by the head 10. By rotating the actuator 4 using the voice coil motor (VCM) 5, the head 10 is moved to and positioned on a desired track of the disk 2. The VCM 5 is driven by a driving current (or a driving voltage) supplied from the driver IC 15.

The head 10 comprises a slider 8, and the aforementioned write head 10W and read head 10R, which are formed in the slider 8 (see FIG. 2). In accordance with the number of the disks 2, a plurality of heads 10 are provided.

The head amplifier IC 11 comprises circuits associated with, for example, the driving and the detection of oscillation characteristic of the STO 100. For instance, the head amplifier IC 11 comprises an STO controller 111, a recording coil controller 112, a reproduction signal detector 113 and a heater controller 114. The head amplifier IC 11 performs the driving of the STO 100 and the detection of the driving signal. Further, the head amplifier IC 11 supplies the write head 10W with a write signal (write current) corresponding to write data from the R/W channel 12. The head amplifier IC 11 amplifies a read signal output from the read head 10R, and supplies it to the R/W channel 12.

The STO controller 111 controls a current supplied to the STO 100 of the write head 10W.

The recording coil controller 112 comprises a write signal pattern controller and a write current controller. The recording coil controller 112 controls a write current, supplied to the coil of the write head 10W, in accordance with a write signal.

The read (reproduction) signal detector 113 detects a signal (read data) reproduced by the read head 10R.

The heater controller 114 controls the supply of a current to heaters described later. Namely, the heater controller 114 switches ON/OFF of the heaters.

The R/W channel 12 is a signal processing circuit that processes signals associated with read and write operations. The R/W channel 12 comprises a read channel that processes read data and a write channel that processes write data. The R/W channel 12 converts a read signal into digital data, and demodulates read data from the digital data. The R/W channel 12 encodes write data transferred from the HDC 13, and transfers the encoded write data to the head amplifier IC 11.

The HDC 13 controls writes data to the disk 2 and reads data from the disk 2 via the head 10, the head amplifier IC 11, the R/W channel 12 and the MPU 14. The HDC 13 constitutes an interface between the magnetic disk device 1 and the host 17 to execute transfer control of read and write data. Namely, the HDC 13 functions as a host interface controller that receives a signal from the host 17 and transfers a signal to the host 17. When transferring a signal to the host 17, the HDC 13 performs error correction processing of data as a read signal read by the head 10 and demodulated under the control of the MPU 14. The HDC 13 also receives commands (write and read commands, etc.) from the host 17, and transfers the received commands to the MPU 14.

The MPU 14 is a main controller for the magnetic disk device 1, and executes control of read/write operations and servo control needed for positioning the head 10. The MPU 14 further executes processing of detecting oscillation degradation of the STO 100 and control associated therewith. The MPU 14 comprises a signal measuring unit 141, a signal comparison/operation unit (comparison/operation unit) 142 and a determination unit 143. The signal measuring unit 141, the signal comparison/operation unit (comparative operator) 142 and the determination unit 143 are implemented by firmware (programs).

The signal measuring unit 141 causes the head 10 to perform signal writing/reading operations to read data from the disk 2 and obtain a read signal. The signal measuring unit 141 stores data associated with the obtained read signal in the memory 16. Further, the signal measuring unit 141 transmits the data associated with the obtained read signal to the comparison/operation unit 142. For instance, the signal measuring unit 141 causes the head 10 to write a data pattern (first data pattern) obtained where a normal current is supplied to the STO 100, and a data pattern (second data pattern) obtained where no current is supplied to the STO 100 or a current smaller than the normal current is supplied to the STO 100, thereby causing the head 10 (head amplifier IC 11) to obtain read signals in the respective states. The normal operation state is used to discriminate writing/reading operations associated with the STO 100 oscillation characteristic evaluation method of the embodiment from (normal) writing/reading operations executed by a user or by a test.

The comparison/operation unit 142 acquires, from the memory 16, data associated with read signals obtained by reading data patterns written where a normal current is supplied to the STO 100, and where no current is supplied to the STO 100 or a current smaller than the normal current is supplied to the STO 100, and executes operations, such as comparison of these data items. The comparison/operation unit 142 stores the operation result in the memory 16, and transmits the operation result to the determination unit 143.

The determination unit 143 determines the oscillation characteristic of the STO 100 from the operation result of the comparison/operation unit 142. Namely, the determination unit 143 determines, from the operation result, the degree of degradation of the STO 100, or whether the STO 100 is good. The determination unit 143 has a determination value as a reference value for evaluating the oscillation characteristic of the STO 100. The determination value can be set arbitrarily. The determination value is, for example, a threshold for a value (comparative data) obtained by comparing data associated with the acquired read signal. The determination value 143 determines the oscillation characteristic of the STO 100 depending upon whether the comparative data is greater than the determination value. The determination value 143 may have a function of instructing the magnetic disk device 1 to send out a warning when the comparative data has reached the determination value. The comparative data is, for example, differential data or radio data of the data associated with the read signal.

The driver IC 15 controls the driving of the SPM 3 and the VCM 5 under the control of the MPU 14. The head 10 is positioned on a target track on the disk 2 by the VCM 5.

The memory 16 comprises a volatile memory and a non-volatile member. For instance, the memory 16 comprises a buffer memory as a DRAM, and a flash memory. The memory 16 stores programs and parameters (such as the determination value) needed for the processing by the MPU 14. Further, the memory 16 comprises a first data storing unit 161 and a second data storing unit 162. In accordance with the processing of the MPU 14 (signal measuring unit 141), the first and second storing units 161 and 162 store data associated with a read signal obtained when a data pattern written where no current is supplied to the STO 100 or where a current smaller than a normal current is supplied to the STO 100 is read. The first and second storing units 161 and 162 also store data associated with a read signal obtained when a data pattern written where the normal current is supplied to the STO 100 is read.

The structure of the head 10 will now be described in detail.

FIG. 2 is a cross-sectional view showing the structure of the head 10. Firstly, as shown in FIG. 2, the head 10 comprises the write head 10W and the read head 10R formed at an end of the slider 8 in a thin-film forming process, and is formed as a separation-type head. The slider 8 has an air bearing surface (ABS) 9 opposing the recording surface of the disk 2 and used to float above the recording surface. The write head 10W writes data to the magnetic disk 2. The read head 10R reads data from the magnetic disk 2.

The write head 10W comprises a main magnetic pole 20, a return magnetic pole 21, a nonconductive member 22, a leading magnetic pole 23, a connection (back gap) 23B, a first recording coil 24, a second recording coil 25, a first terminal 26, a second terminal 27 and the STO 100. The main magnetic pole 20, the return magnetic pole 21 and the leading magnetic pole 23 are formed of a highly permeable material. The main magnetic pole 20 and the return magnetic pole 21 constitutes a first magnetic core providing a closed magnetic path, and a first recording coil 24 is wound around the first magnetic core. Further, the main magnetic pole 20 and the leading magnetic pole 23 constitute a second magnetic core providing another closed magnetic path, and a second recording coil 25 is wound around the second magnetic core.

The main magnetic pole 20 generates a recording magnetic field perpendicular to the recording surface of the disk 2. The main magnetic pole 20 extends substantially perpendicularly to the recording surface of the disk 2. A tip of the main magnetic pole 20 close to the disk 2 is tapered toward the disk surface. Part of the tip of the main magnetic pole 20 is exposed to the ABS 9 of the slider 8. The main magnetic pole 20 is connected to the first terminal 26 for flowing a current. For instance, a direct current is passed through the first terminal 26.

The return magnetic pole 21 is substantially L-shaped such that a tip of the pole 21 close to the disk 2 is bent toward the main magnetic pole 20. The tip of the return magnetic pole 21 opposes the tip of the main magnetic pole 20 with a write gap WG interposed therebetween. The return magnetic pole 21 has a projection at a position away from the disk 2, and the projection is connected to the main magnetic pole 20 with the nonconductive member 22 interposed therebetween. The first recording coil 24 is wound around the projection. The second terminal 27 for flowing a current is connected to the return magnetic pole 21. For instance, a direct current is passed through the second terminal 27, as in the first terminal 26.

The STO 100 is interposed between the tip of the main magnetic pole 20 and the tip of the return magnetic pole 21 within the write gap WG. The STO 100 is formed substantially rectangular parallelepiped and has a stacked structure of magnetic and nonmagnetic films formed by micro-fabricating a magnetic resistance film. The surface formed by the front surface of the main magnetic pole 20, the front surface of the return magnetic pole 21 and the STO 100 is exposed at the ABS 9 and opposed to the recording surface of the disk 2. The STO 100 is electrically connected to the main magnetic pole 20 and the return magnetic pole 21 via a nonmagnetic conductive layer. As a result, the main magnetic pole 20, the STO 100 and the return magnetic pole 21 constitute a conducting circuit. When, for example, a direct current is passed through the STO 100 along the stacked layers, spins in a ferromagnetic substance included in the element perform precessional motion because of the magnetic property of electrons. By this precessional motion, the STO 100 oscillates an alternate current signal in a microwave band (high-frequency magnetic field). Under the control of the MPU 14, the STO controller 111 and the recording coil controller 112 perform the oscillation ON/OFF control of the STO 100.

The leading magnetic pole 23 is formed of a soft magnetic material. The leading magnetic pole 23 is provided on the opposite side of the return magnetic pole 21 with respect to the main magnetic pole 20, namely, provided close to the leading end of the main magnetic pole 20. The leading magnetic pole 23 is substantially L-shaped, and has its tip opposed to the tip of the main magnetic pole 20 with a certain gap interposed therebetween. The upper end of the leading magnetic pole 23 away from the disk 2 is connected to the main magnetic pole 20 by means of a connection 23B formed of a magnetic material. The second recording coil 25 is wound around the connection 23B.

The first and second recording coils 24 and 25 are wound in opposite directions. The first and second recording coils 24 and 25 are connected in series to the head amplifier IC 11. The supply of current to the first and second recording coils 24 and 25 is controlled by the recording coil controller 112. Different currents may be supplied to the first and second recording coils 24 and 25. When an alternate current is passed through the first and second recording coils 24 and 25, the main magnetic pole 20 is excited.

The read head 10R comprises a magnetic film 30 having a magnetoresistive effect, and shield films 31 and 32 provided on the trailing and leading sides of the magnetic film 30, respectively, to hold the magnetic film 30 therebetween. The lower ends of the magnetic film 30 and the shield films 31 and 32 are exposed at the ABS 9 of the slider 8.

As shown in FIG. 2, the head 10 comprises a first heater 28 and a second heater 29 functioning as heat generating elements. The first and second heaters 28 and 29 are embedded in the slider 8. The first heater 28 is provided, for example, above the main magnetic pole 20 between the first and second recording coils 24 and 25. The second heater 29 is provided, for example, beside the shield film 31.

The first and second heaters 28 and 29 are connected to the heater controller 114 of the heat amplifier IC 11. When a current is supplied from the heater controller 114 to the first and second heaters 28 and 29, the first and second heaters 28 and 29 are heated to thereby heat portions of the slider 8 around the heaters. As a result, the slider 8, the write head 10W and the read head 10R are thermally expanded, whereby the ABS 9 is projected toward the disk 2. Thus, the floating amount of the head 10 (i.e., the distance between the ABS 9 of the head 10 and the surface of the disk 2) can be adjusted by the first and second heaters 28 and 29. More specifically, by adjusting the current passing through (or the voltage applied to) the first and second heaters 28 and 29, the degrees of expansion of the slider 8, the write head 10W and the read head 10R can be adjusted. Namely, the floating amount of the head 10 can be adjusted by adjusting the current passing through (or the voltage applied to) the first and second heaters 28 and 29. The number of the heaters is not limited to two.

Three or more heaters may be employed. Yet alternatively, only one heater may be employed.

Figure 3A:
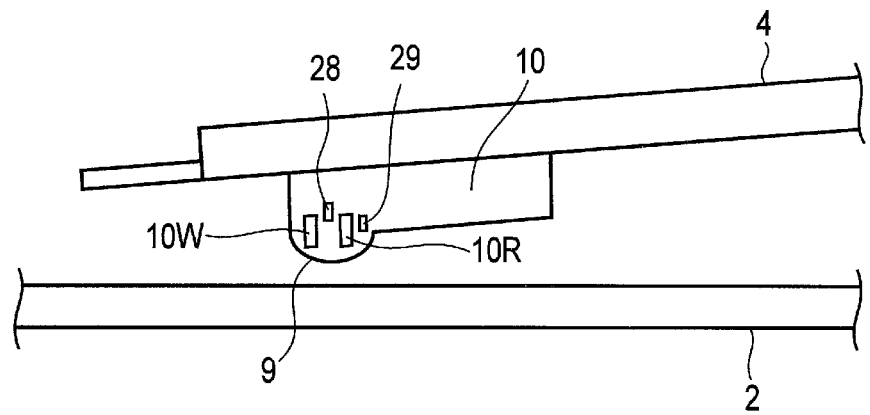
FIG. 3A is a schematic view showing floating amount of a head when a first heater and a second heater are in the ON state.
Figure 3B:
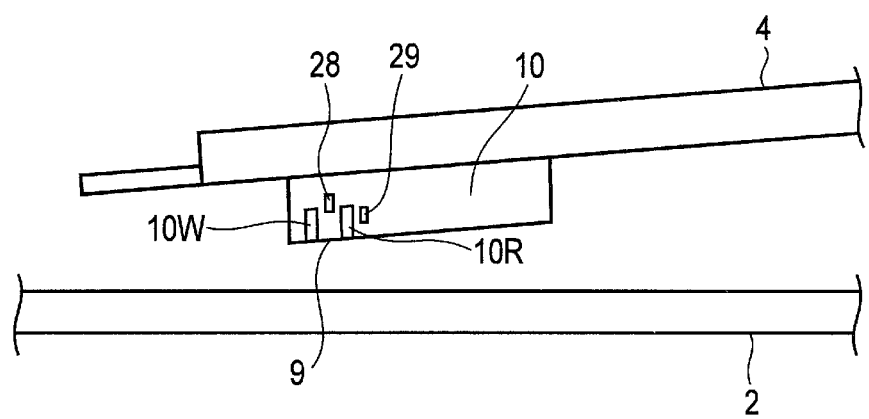
FIG. 3B is a schematic view showing floating amount of the head when the first and second heaters are in the OFF state.

Referring then to FIGS. 3A and 3B, a detailed description will be given of the adjustment of the floating amount by the first and second heaters 28 and 29. FIG. 3A is a schematic view showing the floating amount of the head when the first and second heaters 28 and 29 are in the ON state. FIG. 3B is a schematic view showing the floating amount of the head when the first and second heaters 28 and 29 are in the OFF state (or when a smaller current than in a normal write/read operation state is supplied to the heaters).

As shown in FIG. 3A, if a current is supplied to the first and second heaters 28 and 29 (if the heaters are in the ON state) when the head 10 is floating, the head 10 is heated to thereby project the ABS 9 toward the surface of the disk 2. As a result, the floating amount of the head 10 is reduced, i.e., the distance between the ABS 9 and the surface of the disk 2 is reduced to, for example, about 1 nm. By thus reducing the floating amount, information can be effectively written on or read from the disk 2. At the same time, a high-frequency magnetic field can be sufficiently applied to the disk 2 by the STO 100, whereby a satisfactory high-frequency assist effect can be realized.

In contrast, as shown in FIG. 3B, if no current is supplied to the first and second heaters 28 and 29 (if the heaters are in the OFF state), the ABS 9 of the head 10 is not expanded toward the disk 2, but is maintained substantially flat. At this time, the floating amount of the head 10 is large, and the distance between the ABS 9 and the surface of the disk 2 is as long as about 10 nm. In this high floating state, since the distance between the above-mentioned STO 100 and the disk 2 is great, the high-frequency magnetic field generated by the oscillation of the STO 100 is little applied to the disk 2, and no assist effect is exerted.

[Variation in Magnetic Flux Associated with High-Frequency Assist Recording]

Firstly, a description will be given of variation in the magnetic flux (magnetic field) of the write head 10W associated with high-frequency assist recording.

Referring to FIGS. 4A and 4B, the magnetic flux of the write head 10W will be described.

FIG. 4A is an enlarged cross-sectional view showing the state of the tip of the write head 10W when the STO 100 is oscillating. FIG. 4B is an enlarged cross-sectional view showing the state of the tip of the write head 10W when the STO 100 is not oscillating or when the degree of oscillation of the STO 100 is lower than the normal oscillation of the same. In FIGS. 4A and 4B, M1 denotes the magnetization of the STO 100, more specifically, spins' precessional motion of the STO, M2 denotes a gap magnetic field, and M3 denotes a recording-head magnetic field. The dimensions of M2 and M3 in FIGS. 4A and 4B are indicative of magnetic field intensities.

When the magnetization M1 of the STO 100 is significantly oscillating within the film surface of the STO 100 as shown in FIG. 4A, the permeability of the STO 100 is as low as that of the air. Accordingly, the magnetic flux of the main magnetic pole 20 more greatly flows to the disk 2 than to the write gap WG. As a result, the intensity of the recording head magnetic field M3 becomes greater than that of the gap magnetic field M2 occurring in the write gap WG.

In contrast, when the magnetization M1' of the STO 100 does not oscillate, or when the degree of the oscillation of the magnetization M1' is smaller than in a normal operation state and is perpendicular to the film surface of the STO 100, as is shown in FIG. 4B, the permeability of the STO 100 is greater than that of the air. Accordingly, the magnetic flux of the main magnetic pole 20 more easily flows to the write gap WG, with the result that the intensity of the recording head magnetic field M3 becomes lower than that of the gap magnetic field M2 applied to the write gap WG.

FIG. 5 shows a calculation result example of the intensity of the magnetic field applied to the disk 2 by the head 10. In FIG. 5, the broken line is indicative of the intensity of the magnetic field of a first core (main magnetic pole 20) assumed along the disk 2 (hereinafter, referred to as "just below the core") when the STO 100 does not oscillate. Further, the solid line is indicative of the intensity of the magnetic field assumed just below the first core when the STO 100 is oscillating. In FIG. 5, the vertical axis indicates the strength (tesla: T) of the magnetic field, and the horizontal axis indicates the running-directional position (micrometers: um) of the head 10. Further, ΔH1 indicates the difference in magnetic field intensity between the case where the STO 100 is oscillating in a certain region just below the magnetic pole 20 in the running direction of the head 10, and the case where the STO 100 is not oscillating in the same region. It can be understood from FIG. 5 that the intensity of the magnetic field just below the main magnetic pole 20 is greater by ΔH1 when the STO 100 is oscillating, than when the STO 100 is not oscillating. The magnetic field intensity difference ΔH1 is about 0.1 T or about 1 kOe. Although FIG. 5 shows an example of comparing the case where the STO 100 is oscillating with the case where it is not oscillating, the same result can also be obtained by comparing the case where the STO 100 is normally oscillating with the case where the degree of the oscillation of the STO 100 is smaller than in the normal operation. Namely, the intensity of the magnetic field just below the main magnetic pole 20 is greater in the normal operation of the STO 100 than in the case where the degree of the oscillation of the STO 100 is smaller than in the normal operation. When the oscillation characteristic of the STO 100 is evaluated, the oscillation state of the STO 100 is mainly classified into two cases—one case where the STO 100 is normally oscillating, and the other case where the STO 100 is not oscillating or the degree of the oscillation of the STO 100 is smaller than in the normal operation. The magnitude of the magnetic flux flowing from the main magnetic pole 20 to the disk 2 varies in accordance with the oscillation state of the STO 100.

As described above, when a current, such as a direct current, has been supplied to the STO 100 via the main magnetic pole 20, the permeability of the STO 100 is reduced because of its precessional motion. The STO 100 generates a high-frequency magnetic field and applies it to the disk 2. Further, when an alternate current has been supplied to the first and second recording coils 24 and 25 by the recording coil controller 112, the main magnetic pole 20 is excited. At this time, the main magnetic pole 20 applies a vertical recording magnetic field to the disk 2 located just below the main magnetic pole. By superimposing the high-frequency magnetic field on the recording magnetic field, magnetic recording of high retentive force and high magnetic anisotropy energy can be realized. As a result, information is written in the recording layer of the disk 2 with a desired track width. When a normal recording/reproducing operation is performed on the disk 2, the head 10 is heated by the first and second heaters 28 and 29 as shown in FIG. 3A, thereby adjusting the floating amount of the head to a lower value.

[STO Oscillation Characteristic]

Figure 6A:
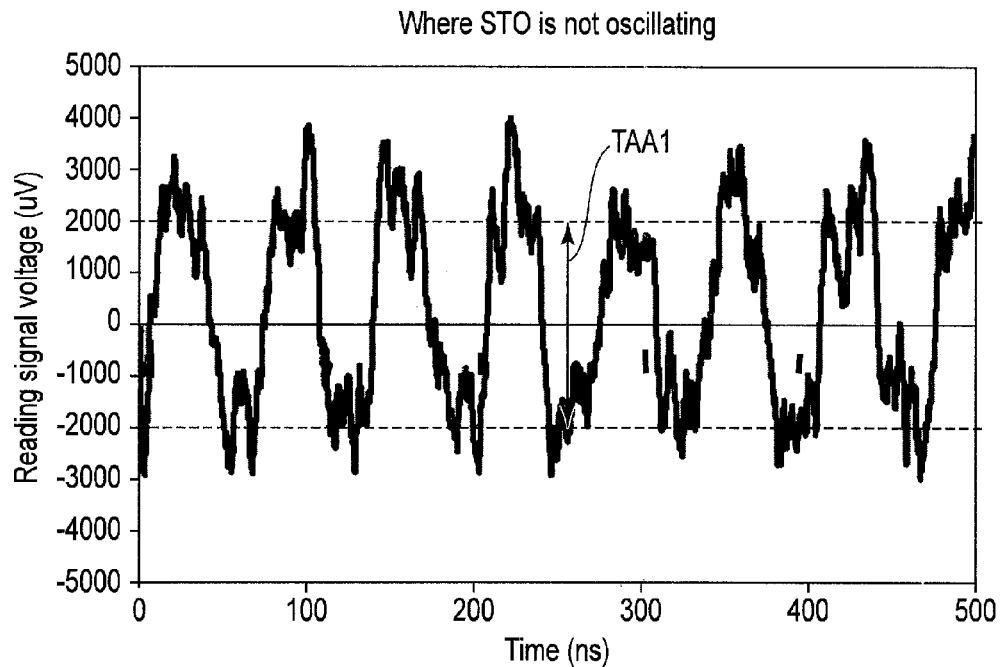
FIG. 6A is a graph showing reading waveform of a low-frequency signal written when floating amount of the head is set larger than in a normal writing operation, and no STO is oscillating.
Figure 6B:
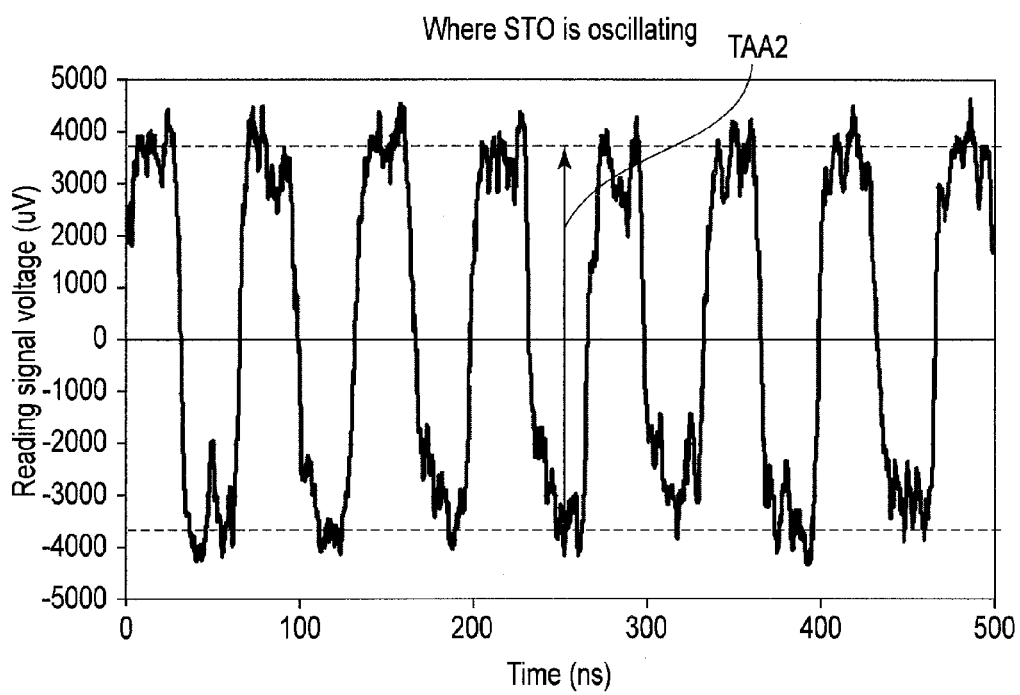
FIG. 6B is a graph showing reading waveform of a low-frequency signal written when the floating amount of the head is set larger than in the normal writing operation, and the STO is oscillating.

Referring then to FIGS. 6A and 6B, a description will be given of the oscillation characteristic of the STO 100.

FIG. 6A shows a reproduction waveform of a low-frequency signal (data pattern) written in a state where the floating amount of the head 10 is set higher than in a normal recording operation, and the STO 100 is not oscillating (i.e., no current or a smaller current than in the normal recording operation is supplied to the STO 100). FIG. 6B shows a reproduction waveform of a low-frequency signal (data pattern) written in a state where the floating amount of the head 10 is set higher than in a normal writing operation, and the STO 100 is oscillating (i.e., a normal current is supplied to the STO 100). In FIGS. 6A and 6B, a first output (read) signal TAA1 and a second output (read) signal TAA2 are indicative of signal output values as the average amplitudes of the respective read (reproduction) waveforms.

In the first embodiment, the oscillation characteristic of the STO 100 is evaluated utilizing, for example, the average output values TAA of the read waveforms from the read head 10R. Further, in the head 10, the oscillation characteristic of the STO 100 is evaluated with the first and second heaters 28 and 29 kept OFF. Namely, the oscillation characteristic of the STO 100 is evaluated with the floating amount of the head 10 kept high. Since in this case, the floating amount of the head 10 is high, the intensity of the high-frequency magnetic field applied to the disk 2 by the STO 100 is as low as can be ignored. Namely, when the oscillation characteristic of the STO 100 is evaluated, the disk 2 is free from the assist effect of the STO 100. Accordingly, if the STO 100 is oscillating, a large magnetic flux is applied to the disk 2 by the main magnetic pole 20, and a signal of a high level is recorded on the disk 2. In contrast, if the STO 100 is not oscillating, a small magnetic flux is applied to the disk 2, and a signal of a low level is recorded on the disk 2. Therefore, the read waveform of the signal written when the STO 100 is oscillating (a normal current is supplied to the STO) has a large amplitude. The read waveform of the signal written when the STO 100 is not oscillating (no current or a smaller current than the normal current is supplied to the STO) has a small amplitude.

By comparing the read waveform output values TAA1 and TAA2 shown in FIGS. 6A and 6B, it can be understood that the output value of the read waveform of the signal written when the STO 100 is oscillating is higher than that of the read waveform of the signal written when the STO 100 is not oscillating (TAA2>TAA1).

Thus, by detecting the difference in read waveform signal output values TAA2 and TAA1, the oscillation characteristic of the STO 100 can be evaluated. For instance, the MPU 14 obtains TAA2 and TAA1, and compares them to detect the difference $\Delta$TAA therebetween. By determining whether $\Delta$TAA has a positive or negative value, it can be determined whether there is an oscillation of the STO 100, or the degree of the oscillation can be determined.

For convenience sake of the description, TAA1 (first read signal) is set as a read signal indicative of a data pattern written when the STO 100 is not oscillating or when a smaller current than in a normal recording operation is supplied, and TAA2 (second read signal) is set as a read signal indicative of a data pattern written when the STO 100 is oscillating. $\Delta$TAA is set as comparative data obtained by comparing TAA1 with TAA2.

Although TAA1, TAA2 and $\Delta$TAA are associated with the average amplitudes of the read waveforms of low-frequency signals, other types of signals may be employed. It is sufficient if the signals can be obtained by the MPU 14 (signal measuring unit 141).

A description will now be given of an example of a detection of the oscillation characteristic of the STO 100, i.e., an example of a detection of degradation (in oscillation characteristic) of the STO 100.

Figure 7:
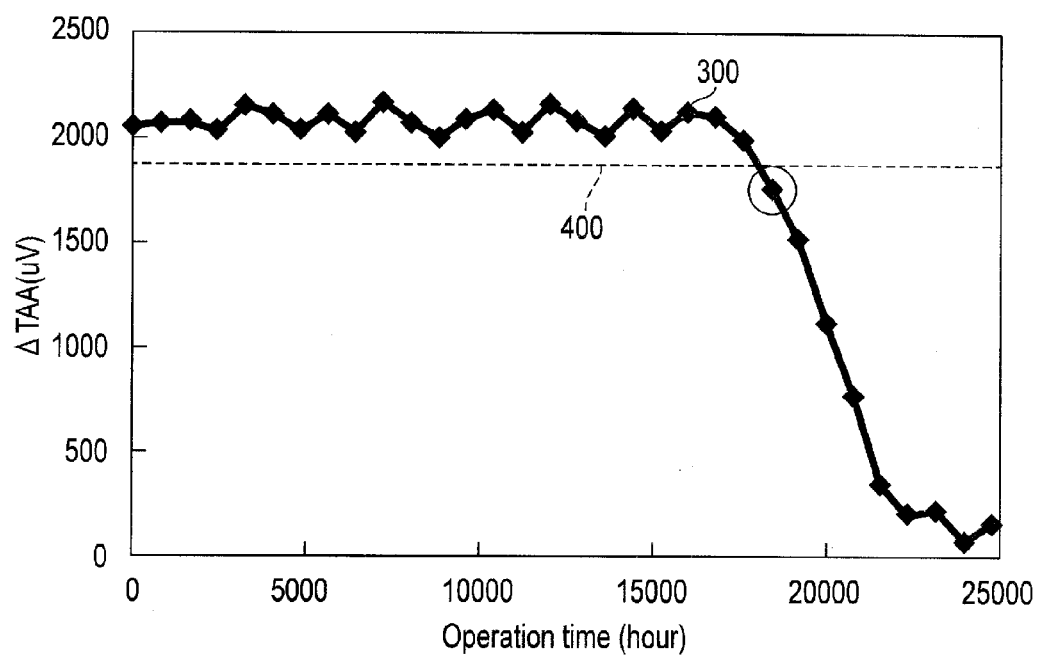
FIG. 7 is a graph showing a result of regular monitoring of differences in average amplitude of reading signals.

FIG. 7 shows a result of regularly monitoring comparative data $\Delta$TAA 300. In FIG. 7, the vertical axis indicates comparative data $\Delta$TAA (micro-volts: uV), and the horizontal axis indicates the operation time period (time: hour) of the magnetic disk device 1. In FIG. 7, $\Delta$TAA 300 indicates comparative data ($\Delta$TAA). Further, reference number 400 denotes a predetermined threshold (determination value).

In FIG. 7, the comparative data $\Delta$TAA 300 indicates the difference between the average amplitude TAA1 obtained when the floating amount of the head 10 is greater than in the normal state and no current is supplied to the STO 100, and the average amplitude TAA2 obtained when a current is supplied to the STO 100. Namely, $\Delta$TAA 300=TAA2−TAA1. Further, the processing of confirming $\Delta$TAA is performed by the MPU 14 regularly or arbitrarily.

Further, $\Delta$TAA 300 may be data indicative of the ratio between TAA1 and TAA2, although not shown. In this case, for example, $\Delta$TAA 300=TAA1/TAA2.

If the oscillation characteristic of the STO 100 is degraded, the oscillation strength of the STO 100 is degraded. As a result, $\Delta$TAA 300 is also degraded. Accordingly, if $\Delta$TAA 300 falls below a predetermined threshold, the determination unit 143 determines degradation of the STO 100 under the control of the MPU 14. For instance, in FIG. 7, when $\Delta$TAA 300 falls below a threshold 400, the determination unit 143 determines that the STO 100 is degraded. The determination unit 143 arbitrarily sets the threshold 400 (determination value). For instance, the determination unit 143 sets the threshold 400 to a value 10% lower than the value of $\Delta$TAA 300 assumed during the initial operation of the magnetic disk device 1. The threshold 400 will hereinafter be referred to as a determination value set by the determination unit 143.

[Evaluation Method for STO Oscillation Characteristic]

A description will be given of a method of evaluating the oscillation characteristic of the STO 100 based on the above-described principle.

Firstly, an outline of the method of evaluating the oscillation characteristic of the STO 100 will be described.

The evaluation of the oscillation characteristic of the STO 100 is performed by the MPU 14 regularly or arbitrarily. In the first embodiment, when the oscillation characteristic of the STO 100 is evaluated, firstly, the actuator 4 is driven by the MPU 14 with the disk 2 rotated, thereby moving the head 10 to a predetermined position on the disk 2. The predetermined position is a monitor area 200 on the disk 2. At this time, the first and second heaters 28 and 29 are kept OFF by the MPU 14 to thereby set the floating amount of the head 10 larger than in the normal writing state. When the floating amount is large, the magnetization of the recording layer of the disk 2 is not saturated by the magnetic field of the main magnetic pole 20. In view of this, the floating amount of the head 10 is raised to an extent at which the high-frequency magnetic field applied to the disk 2 by the write head 10W is sufficiently reduced.

Subsequently, a predetermined data pattern is recorded by the write head 10W on the monitor area 200 of the disk 2. The written data pattern (recorded information) is read by the read head 10R, and a read signal corresponding to the thus-read data pattern is sent to the read signal detector 113. The MPU 14 (signal measuring unit 141) obtains a read signal via the read signal detector 113. The MPU 14 causes the comparison/operation unit 142 to perform a comparison associated with the read signal. The determination unit 143 determines the oscillation characteristic of the STO 100 based on the operation result of the MPU 14.

A further detailed description will be given of the method of evaluating the oscillation characteristic of the STO 100 with reference to the figure associated therewith.

Figure 8:
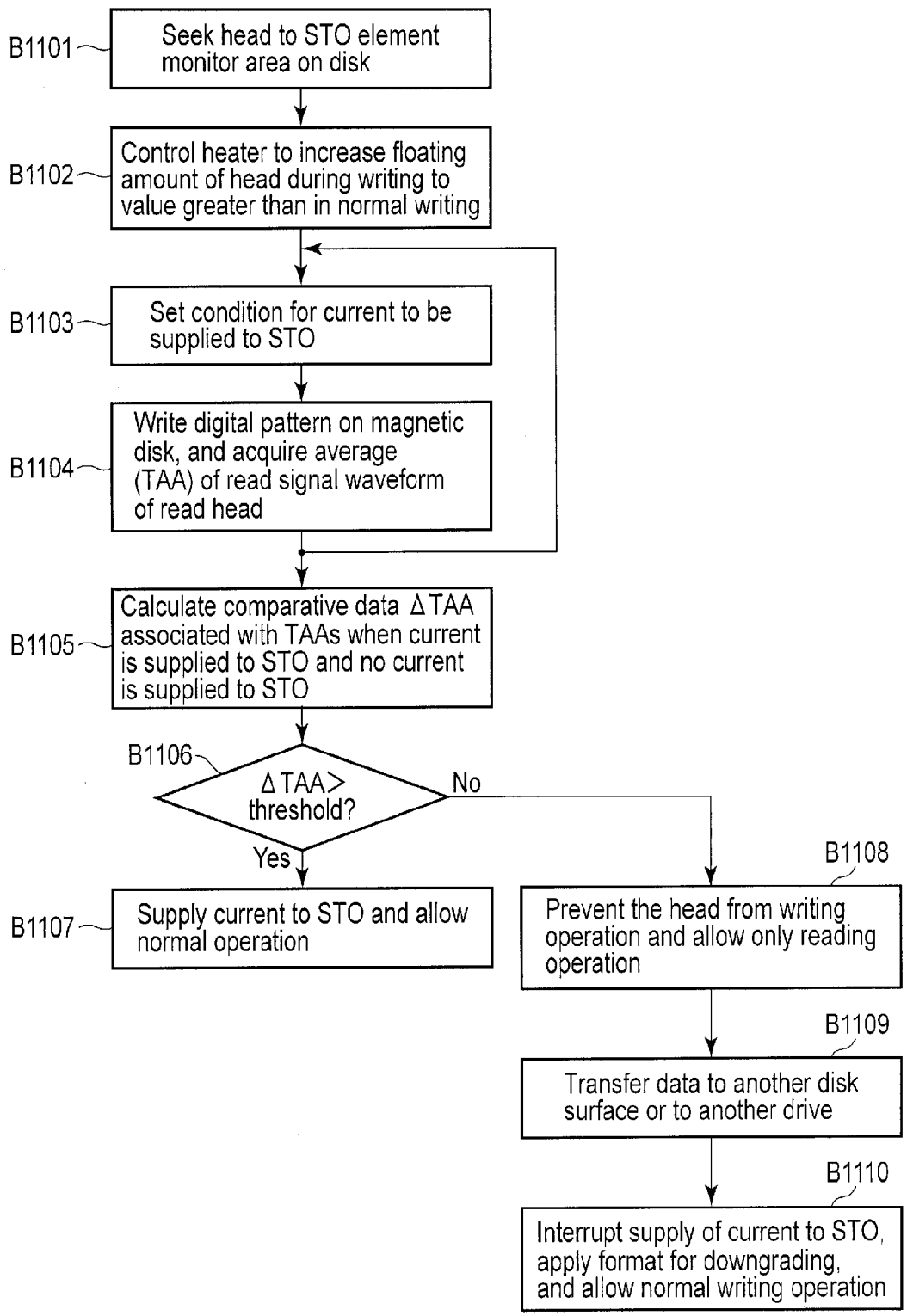
FIG. 8 is a flowchart for determining whether there is an STO oscillation.

FIG. 8 is a flowchart for determining whether there is an oscillation of the STO 100.

When the oscillation characteristic of the STO 100 is evaluated by the above-described oscillation characteristic evaluation method, firstly, in B1101 of FIG. 8, the head 10 is sought by the actuator 4 to the monitor area 200 preset on the disk 2. In B1102, the MPU 14 controls the first and second heaters 28 and 29 to increase the floating amount of the head 10 in order to sufficiently reduce the high-frequency magnetic field applied to the disk 2. Namely, no current or a smaller current than in a normal writing operation is supplied to the first and second heaters 28 and 29. In B1103, a condition for the current supplied to the STO 100 is set. In B1104, a plurality of data patterns are written by the write head 10W in the monitor area 200, and are read by the read head 10R. At this time, the signal measuring unit 141 obtains the average amplitude (first read signal) TTA1 of a read signal waveform corresponding to a data pattern (first data pattern) written when no current or a smaller current than in the normal writing operation is supplied to the STO 100, and also obtains the average amplitude (second read signal) TTA2 of a read signal waveform corresponding to a data pattern (second data pattern) written when a normal current is supplied to the STO 100. The signal measuring unit 141 stores these signals TAA1 and TAA2 in the memory 16. For instance, the signal measuring unit 141 stores TAA1 in the first data storing unit 161, and stores TAA2 in the second data storing unit 162. In B1105, the comparison/operation unit 142 calculates comparative data ΔTAA 300 by comparing TAA1 and TAA2 obtained in B1104. In B1106, the determination unit 143 determines whether the calculated ΔTAA 300 is greater than a threshold 400. If it is determined that ΔTAA 300 is greater than the threshold 400 (Yes in B1106), the determination unit 143 determines in B1107 that the STO 100 is sufficiently oscillating, whereby the MPU 14 supplies a current to the STO 100 to cause the magnetic disk device 1 to continue the normal writing/reading operation.

In contrast, if ΔTAA 300 is not greater than the threshold 400 (No in B1106), the determination unit 143 determines in B1107 that the STO 100 is not sufficiently oscillating, whereby the MPU 14 temporarily stops the writing operation of the head 10 and allows only a reading operation. In B1109, the MPU 14 reads data from the recording layer (disk surface or head surface) of the disk 2 opposing the head 10, and transfers (records) the data to the other recording layer (disk surface or head surface) of the disk 2 in the same magnetic disk device 1. If another magnetic disk device is connected to the magnetic disk device 1, the read data may be transferred to said another magnetic disk device. After completing the data transfer, in B1110, the MPU 14 interrupts the supply of current to the STO 100, and allows the head 10 to initiate a writing operation on the other recording layer and to continue the operation, with a new format (for downgrading) applied.

In the first embodiment, the determination unit 143 can determine the oscillation characteristic of the STO 100, using a plurality of signals obtained by the read signal detector 113, and the operation result of the comparison/operation unit 142 based on these signals. The read signal waveform of the read head 10R can be obtained easily and highly accurately. Accordingly, in the magnetic disk device 1 of the first embodiment, the oscillation characteristic of the STO 100 can be evaluated easily and highly accurately. Namely, it can be determined easily and highly accurately whether the head 10 comprising the STO 100 is in good condition.

Further, even if the STO 100 is degraded during the operation of the magnetic disk device 1, the head can be continuously used as a downgraded head with no high-frequency assist recording function, by employing a format for limiting the operation of the STO 100.

Magnetic disk devices and spin torque oscillation characteristic evaluation methods according to other embodiments will hereinafter be described. In the other embodiments, elements similar to those of the first embodiment are denoted by corresponding reference numbers, and no detailed description will be given thereof.

Second Embodiment

A magnetic disk device 1 according to a second embodiment will be described. The magnetic disk device 1 comprises a sector (evaluation area) 201 for evaluating the oscillation characteristic of the STO 100.

Figure 9:
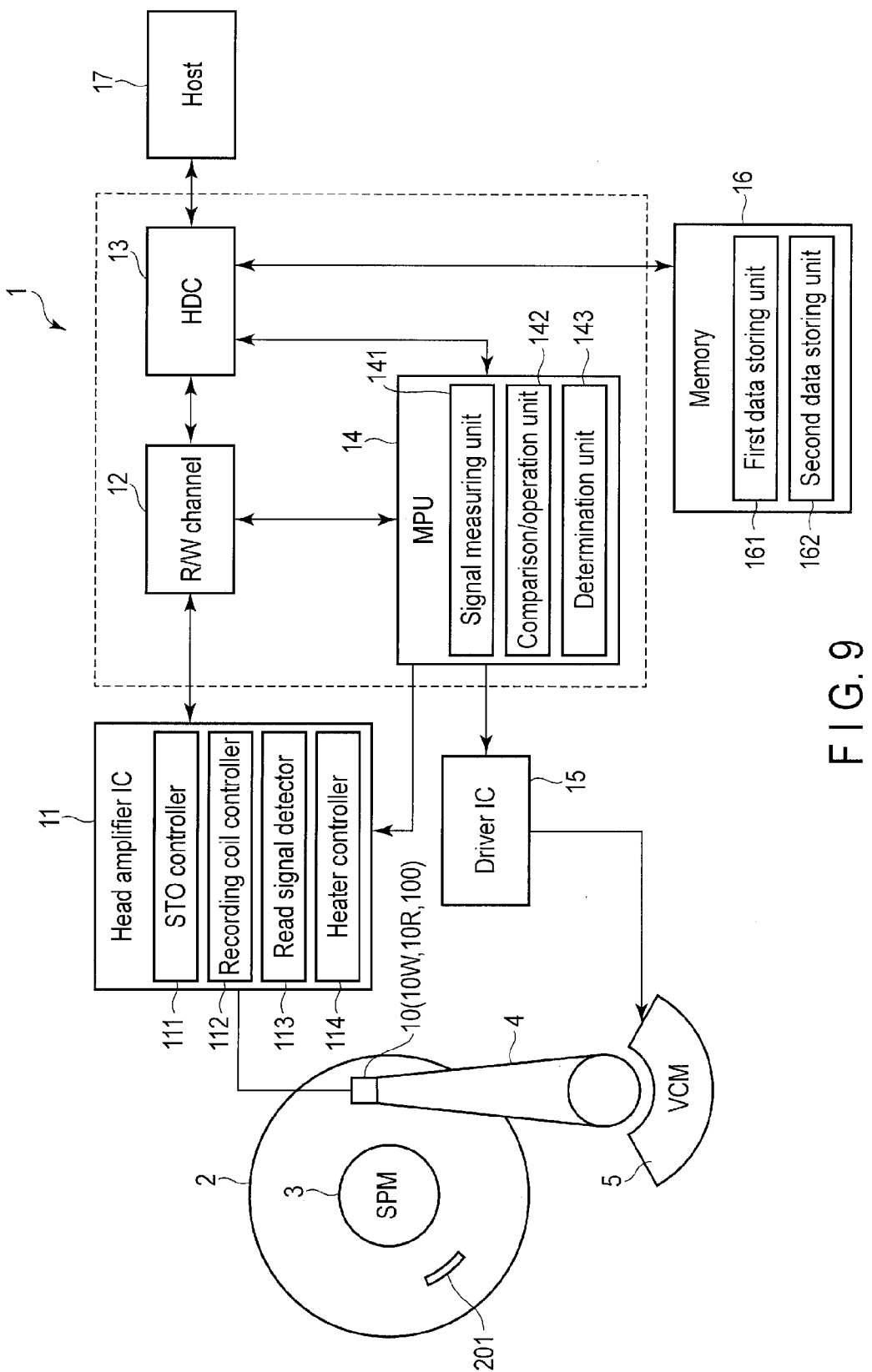
FIG. 9 is a block diagram showing a magnetic disk device according to a second embodiment.

FIG. 9 is a block diagram showing the magnetic disk device 1 of the second embodiment.

In the above-described first embodiment, signal writing (recording) and reading (reproducing) for evaluating the oscillation characteristic are performed using the dedicated monitor area 200 on the disk 2. In contrast, in the second embodiment, signal writing and detection (reproduction (read)) for the evaluation are performed using a predetermined or arbitrary sector (evaluation area) 201 on the disk 2.

A method of evaluating whether there is an oscillation of the STO 100, according to the second embodiment, will now be described.

Figure 10:
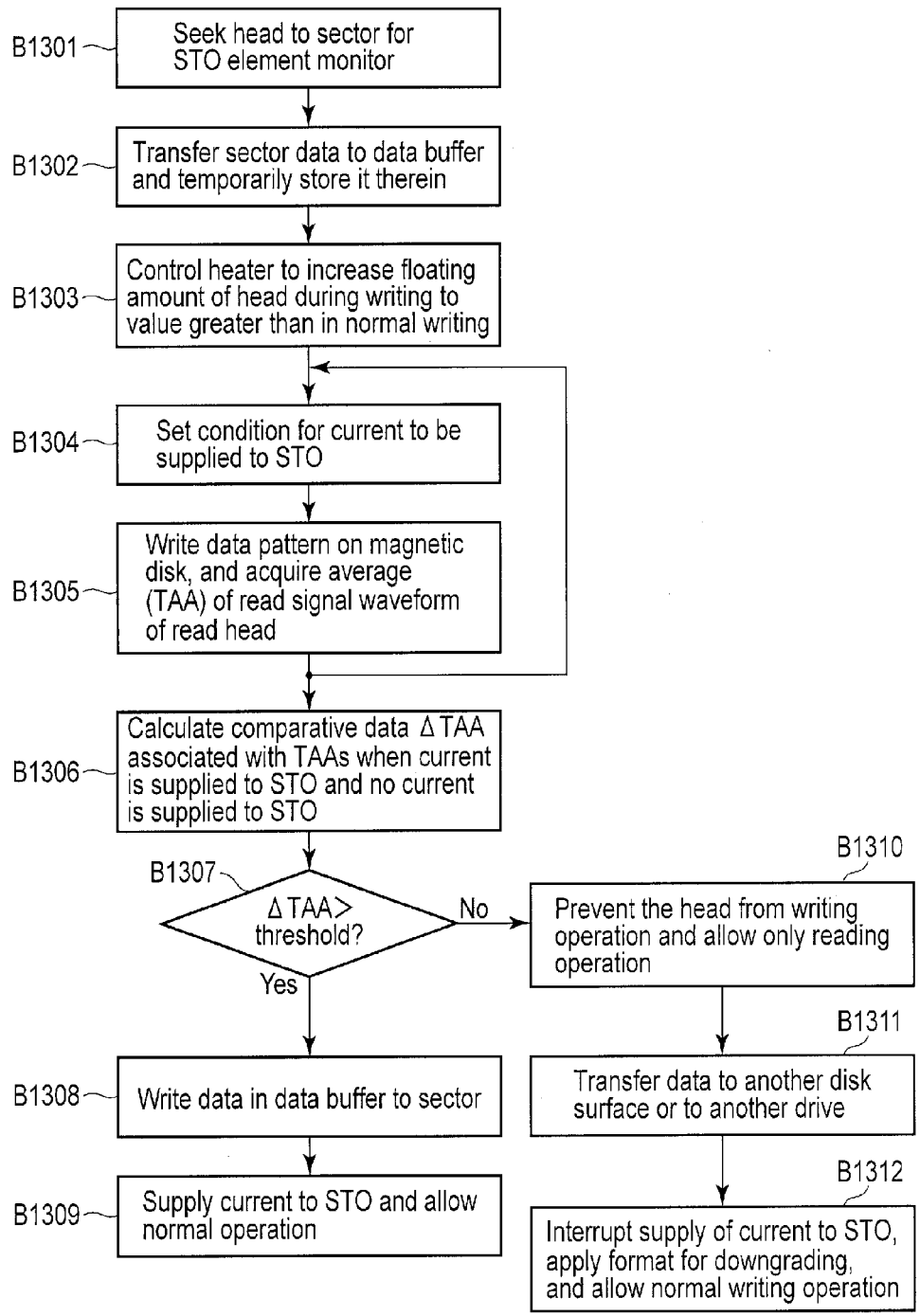
FIG. 10 is a flowchart employed in the magnetic disk device of the second embodiment to determine whether there is an STO oscillation.

FIG. 10 is a flowchart employed in the second embodiment for determining whether there is an STO oscillation.

Firstly, in B1301, the head 10 is sought by the actuator 4 to the sector 201 preset on the disk 2. In B1302, the MPU 14 reads data from the sector 201, using the head 10, and transfers and temporarily stores the read data to and in the data buffer of the memory 16.

Subsequently, in B1303, the MPU 14 controls the first and second heaters 28 and 29 to increase the floating amount of the head 10 so as to sufficiently reduce the intensity of the high-frequency magnetic field applied to the disk 2. Namely, no current or a smaller current than in a normal writing operation is supplied to the first and second heaters 28 and 29. In B1304, a condition for the current supplied to the STO 100 is set. In B1305, the MPU 14 writes a data pattern in the sector 201 using the write head 10W, reads (reproduces) the written data pattern using the read head 10R, and stores the read data pattern in the memory 16. The signal measuring unit 141 obtains the average amplitude TTA1 of a read signal waveform corresponding to a data pattern written when no current or a smaller current than in the normal recording operation is supplied to the STO 100, and also obtains the average amplitude TTA2 of a read signal waveform corresponding to a data pattern written when a normal current is supplied to the STO 100. The signal measuring unit 141 stores TAA1 and TAA2 in the memory 16. For instance, the signal measuring unit 141 stores TAA1 and TAA2 in the first and second data storing units 161 and 162, respectively. In B1306, the comparison/operation unit 142 calculates comparative data ΔTAA 300 by comparing the obtained TAA1 and TAA2. In B1307, the determination unit 143 determines whether the calculated ΔTAA 300 is greater than a threshold 400. If it is determined that ΔTAA 300 is greater than the threshold 400 (Yes in B1307), the determination unit 143 determines in B1308 that the STO 100 is sufficiently oscillating. In this case, the MPU 14 causes the head 10 to rewrite, to the sector 201, the data stored in the buffer memory of the memory 16, and then supplies a current to the STO 100 to cause the magnetic disk device 1 to continue the normal writing/reading operation.

In contrast, if ΔTAA 300 is not greater than the threshold 400 (No in B1307), the determination unit 143 determines in B1310 that the STO 100 is not sufficiently oscillating, whereby the MPU 14 temporarily stops the writing operation of the head 10 and allows only a reading operation. In B1311, the MPU 14 reads data from the recording layer (disk surface or head surface) of the disk 2 opposing the head 10, and from the buffer, and transfers (records) the data to the other recording layer (disk surface or head surface) of the disk 2 in the same magnetic disk device 1. If another magnetic disk device is connected to the magnetic disk device 1, the read data may be transferred to said another magnetic disk device. After completing the data transfer, in B1312, the MPU 14 interrupts the supply of current to the STO 100 and allows the head 10 to initiate a recording operation on the other recording layer and to continue the operation, with a new format (for downgrading) applied.

The second embodiment can provide a magnetic disk device wherein the oscillation characteristic of the STO 100 can be evaluated easily and highly accurately, and provide an evaluation method for use in the device. Further, in the second embodiment, it is not necessary to set a dedicated evaluation area on the disk 2, and the MPU 14 can evaluate the oscillation characteristic of the STO 100, utilizing a preset or arbitrary sector.

Third Embodiment

A description will be given of an evaluation method, according to a third embodiment, of evaluating the oscillation characteristic of the STO 100 of the magnetic disk device according to the first embodiment. The STO oscillation characteristic evaluation method of the third embodiment is executed on the magnetic disk device 1 in a shipping test process, to determine, for example, whether the magnetic disk device 1 is in good condition.

Figure 11:
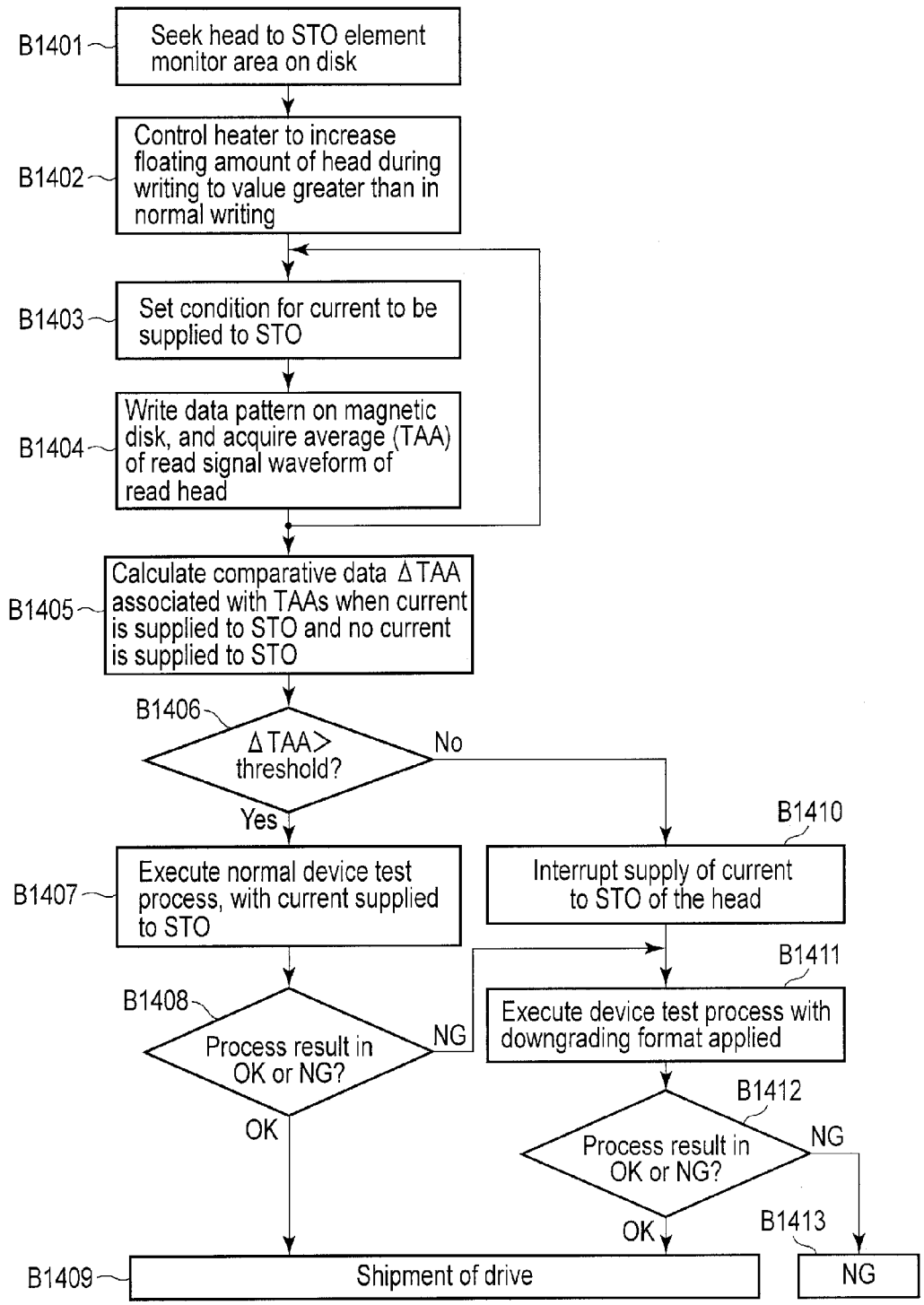
FIG. 11 is a flowchart showing a method, according to a third embodiment, executed in a shipping test process for determining whether there is an STO oscillation.

FIG. 11 is a flowchart showing the method of the third embodiment executed in the shipping test process for determining whether there is an STO oscillation.

Firstly, in B1401, the head 10 is sought by the actuator 4 to the monitor area 200 preset on the disk 2. In B1402, the MPU 14 controls the first and second heaters 28 and 29 to increase the floating amount of the head 10 in order to sufficiently reduce the high-frequency magnetic field applied to the disk 2. Namely, no current or a smaller current than in a normal writing operation is supplied to the first and second heaters 28 and 29. In B1403, a condition for the current supplied to the STO 100 is set. In B1404, the MPU 14 causes the write head 10W to write a data pattern to the monitor area 200, and then causes the read head 10R to read the written data pattern. At this time, the MPU 14 obtains the average amplitude TTA1 of a read signal waveform corresponding to a data pattern written when no current or a smaller current than in the normal writing operation is supplied to the STO 100, and also obtains the average amplitude TTA2 of a read signal waveform corresponding to a data pattern written when a normal current is supplied to the STO 100. The MPU 14 stores these signals TAA1 and TAA2 in the memory 16.

In B1405, the comparison/operation unit 142 calculates comparative data ΔTAA 300 by comparing TAA1 and TAA2 obtained in B1104. In B1406, the determination unit 143 determines whether the calculated ΔTAA 300 is greater than a threshold 400. If it is determined that ΔTAA 300 is greater than the threshold 400 (Yes in B1406), the determination unit 143 determines in B1407 that the STO 100 is sufficiently oscillating. In this case, the MPU 14 supplies a current to the STO 100 and thereafter executes a normal device test process. If it is determined in B1408 that the magnetic disk device 1 has passed the device test (OK in B1408), the magnetic disk device 1 is shipped as a normal product in B1409.

In contrast, if ΔTAA 300 is not greater than the threshold 400 (No in B1406), the determination unit 143 determines in B1410 that the STO 100 is not sufficiently oscillating. In this case, the MPU 14 restricts the supply of current to the STO 100, and executes, in B1411, a device test process based on a format for downgrading. Also when the magnetic disk device 1 has not passed the device test (NG in B1408), the processing in B1411 is executed. If the magnetic disk device 1 has passed this test process (OK in B1412), it is shipped as a downgraded product with no high-frequency assist recording function. Further, if the magnetic disk device 1 has not passed the test process (NG in B1412), it is regarded as a defective product and is not shipped.

The STO oscillation characteristic evaluation method of the third embodiment enables the oscillation state of the STO 100 to be determined not from an index, such as a bit error, that requires a lot of time, but from a very simple index, such as ΔTAA, that does not require a lot of time. Accordingly, it can be determined in a short time whether the magnetic disk device 1 is a normal product or a downgraded product, and whether it should be shipped or not. Thus, the time required for determining the condition of the magnetic disk device 1 can be reduced.

The STO oscillation characteristic evaluation method of the third embodiment is also applicable to the magnetic disk device 1 of the second embodiment.

Fourth Embodiment

A STO oscillation characteristic evaluation method according to a fourth embodiment will be described. The method of the fourth embodiment is substantially the same as the method of the third embodiment except for some blocks. The STO oscillation characteristic evaluation method of the fourth embodiment is executed on a test magnetic disk device having substantially the same structure as the magnetic disk device 1 of the first or second embodiment. The STO oscillation characteristic evaluation method of the fourth embodiment is utilized for determining whether the head 10 before shipping is in good condition.

FIG. 12 is a flowchart showing the method of the fourth embodiment executed in a shipping test process for determining whether there is an STO oscillation.

In B1501, the head 10 is loaded onto the disk 2. In B1502, the MPU 14 controls the first and second heaters 28 and 29 to increase the floating amount of the head 10 in order to sufficiently reduce the high-frequency magnetic field applied to the disk 2. Namely, no current or a smaller current than in a normal writing operation is supplied to the first and second heaters 28 and 29. In B1503, a condition for the current supplied to the STO 100 is set. In B1504, the MPU 14 causes the write head 10W to write a data pattern to a desired area on the disk 2, and then causes the read head 10R to read the written data pattern. At this time, the MPU 14 obtains the average amplitude TTA1 of a read signal waveform corresponding to a data pattern written when no current or a smaller current than in the normal writing operation is supplied to the STO 100, and also obtains the average amplitude TTA2 of a read signal waveform corresponding to a data pattern written when a normal current is supplied to the STO 100. The MPU 14 stores these signals TAA1 and TAA2 in the memory 16. In B1505, the comparison/operation unit 142 calculates comparative data ΔTAA 300 by comparing TAA1 and TAA2 obtained in B1504. In B1506, the determination unit 143 determines whether the calculated ΔTAA 300 is greater than a threshold 400. If it is determined that ΔTAA 300 is greater than the threshold 400 (Yes in B1506), the determination unit 143 determines in B1507 that the STO 100 is sufficiently oscillating. In this case, the MPU 14 supplies a current to the STO 100 and thereafter executes a normal head test process. If it is determined in B1508 that the head 10 has passed the head test (OK in B1508), the head 10 is shipped as a normal product in B1509.

In contrast, if ΔTAA 300 is not greater than the threshold (No in B1506), the determination unit 143 determines in B1510 that the STO 100 is not sufficiently oscillating. In this case, the MPU 14 restricts the supply of current to the STO 100 of the head 10 and executes a head test process based on a format for downgrading (B1510). Also when the head 10 has not passed the head test (NG in B1508), the processing in B1510 is executed. If the head 10 has passed this test process (OK in B1511), it is shipped in B1509 as a downgraded product with no high-frequency assist recording function. Further, if the head 10 has not passed the test process (NG in B1511), it is regarded as a defective product and is not shipped.

The STO oscillation characteristic evaluation method of the fourth embodiment enables the oscillation state of the STO 100 to be determined not from an index, such as a bit error, that requires a lot of time, but from a very simple index, such as ΔTAA, that does not require a lot of time. Accordingly, it can be determined in a short time whether the head 10 is a normal product or a downgraded product, and whether it should be shipped or not. Thus, the time required for determining the condition of the head 10 can be reduced.

In the above-described embodiments, the determination unit 143 can determine the oscillation characteristic of the STO 100, using a plurality of signals obtained by the reproduction signal detector 113, and the operation result of the comparison/operation unit 142 based on the signals. The read signal waveform of the read head 10R can be obtained easily and highly accurately. Accordingly, in the magnetic disk device 1 of the first embodiment, the oscillation characteristic of the STO 100 can be evaluated easily and highly accurately. Namely, it can be determined easily and highly accurately whether the head 10 comprising the STO 100 is in good condition.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic head including a write head with a high-frequency oscillator and a read head;
a recording medium to and from which data is written and read by the magnetic head;
a driving unit configured to move the magnetic head on the recording medium;
a measuring unit configured to obtain a first read signal and a second read signal, the first read signal being obtained by reading a first data pattern written when no current is supplied to the high-frequency oscillator or a smaller current than in a writing operation to the recording medium is supplied to the high-frequency oscillator, the second read signal being obtained by reading a second data pattern written when a current supplied in the normal writing operation to the recording medium is supplied to the high-frequency oscillator;
a comparison unit configured to calculate comparative data indicative of a comparison result between the first and second read signals; and
a determination unit configured to determine an oscillation characteristic of the high-frequency oscillator from the comparative data.

2. The magnetic disk device of claim 1, further comprising:
a heater provided in the magnetic head, and to generate heat for changing floating amount of the magnetic head when a current is supplied thereto,
wherein the measuring unit obtains the first read signal and the second read signal, when no current is supplied to the heater or a smaller current than in the writing operation to the recording medium and in a reading operation from the recording medium is supplied to the heater.

3. The magnetic disk device of claim 2, wherein the recording medium comprises an evaluation area for evaluating the oscillation characteristic of the high-frequency oscillator, and
wherein the first and second data patterns are written in the evaluation area.

4. The magnetic disk device of claim 3, wherein the determination unit determines the oscillation characteristic of the high-frequency oscillator depending upon whether the comparative data is greater than a determination value for evaluating the oscillation characteristic of the high-frequency oscillator.

5. The magnetic disk device of claim 4, further comprising a controller allows the writing operation to the recording medium and the reading operation from the recording medium, when the determination unit determines that the comparative data is greater than the determination value.

6. The magnetic disk device of claim 4, further comprising a controller configured to prevent the write head from performing a writing operation, when the determination unit determines that the comparative data is not greater than the determination value.

7. The magnetic disk device of claim 6, wherein when the determination unit determines that the comparative data is not greater than the determination value, the controller reads data written by the write head from the recording medium and writes the read data to any one of another recording area of the recording medium and another recording medium.

8. The magnetic disk device of claim 6, wherein when preventing the write head from performing the writing operation, the controller applies a new format and allows a writing operation with interrupting supply of a current to the high-frequency oscillator.

9. The magnetic disk device of claim 2, wherein the determination unit determines the oscillation characteristic of the high-frequency oscillator depending upon whether the comparative data is greater than a determination value for evaluating the oscillation characteristic of the high-frequency oscillator.

10. A method of evaluating a magnetic head which comprises a write head with a high-frequency oscillator, and a read head, the method comprising:
obtaining a first read signal and a second read signal, the first read signal being obtained by reading a first data pattern written when no current is supplied to the high-frequency oscillator or a smaller current than in a writing operation to the recording medium is supplied to the high-frequency oscillator, the second read signal being obtained by reading a second data pattern written when a current supplied in the writing operation to the recording medium is supplied to the high-frequency oscillator;

calculating comparative data indicative of a comparison result between the first and second read signals; and determining an oscillation characteristic of the high-frequency oscillator from the comparative data.

11. The method of claim 10, the magnetic head further comprises a heater configured to generate heat when a current is supplied thereto, the method further comprising obtaining the first read signal and the second read signal, when no current is supplied to the heater or a smaller current than in the writing operation to the recording medium and in a reading operation from the recording medium is supplied to the heater.

12. The method of claim 11, further comprising writing in an evaluation area for evaluating the oscillation characteristic of the high-frequency oscillator, and wherein the first and second data patterns are written in the evaluation area.

13. The method of claim 12, further comprising determining the oscillation characteristic of the high-frequency oscillator depending upon whether the comparative data is greater than a determination value for evaluating the oscillation characteristic of the high-frequency oscillator.

14. The method of claim 13, further comprising allowing the writing operation to the recording medium and reading operation from the recording medium, when it is determined that the comparative data is greater than the determination value.

15. The method of claim 13, further comprising preventing the write head from performing a writing operation, when it is determined that the comparative data is not greater than the determination value.

16. The method of claim 15, further comprising, when it is determined that the comparative data is not greater than the determination value, reading data written by the write head from the recording medium and writing the read data to any one of another recording area of the recording medium and another recording medium.

17. The method of claim 15, further comprising, when preventing the write head from performing the writing operation, applying a new format and allowing a writing operation with interrupting supply of a current to the high-frequency oscillator.

18. The method of claim 11, further comprising determining the oscillation characteristic of the high-frequency oscillator depending upon whether the comparative data is greater than a determination value for evaluating the oscillation characteristic of the high-frequency oscillator.

* * * * *